(12) United States Patent
Lee

(10) Patent No.: US 6,452,963 B1
(45) Date of Patent: Sep. 17, 2002

(54) METHOD FOR CONNECTING MODEMS

(75) Inventor: Seong Kwon Lee, Kyungsangbuk-do (KR)

(73) Assignee: Hyundai Electronics Industries Co., Ltd., Ichon-shi (KR)

( * ) Notice: Subject to any disclaimer, the term of this patent is extended or adjusted under 35 U.S.C. 154(b) by 0 days.

(21) Appl. No.: 09/239,532

(22) Filed: Jan. 29, 1999

(30) Foreign Application Priority Data

Feb. 4, 1998 (KR) .......................................... 1998-3063

(51) Int. Cl.[7] .................................................. H04B 1/38
(52) U.S. Cl. ........................................ 375/222; 375/219
(58) Field of Search ................................. 375/219, 222, 375/221, 224, 225, 377; 455/73; 358/1.15; 370/224, 249; 714/715, 716

(56) References Cited

U.S. PATENT DOCUMENTS

| | | | | |
|---|---|---|---|---|
| 5,815,495 A | * | 9/1998 | Saiton et al. ................ | 370/249 |
| 6,075,620 A | * | 6/2000 | Yoshida et al. .............. | 358/434 |
| 6,263,016 B1 | * | 7/2001 | Bellenger et al. ........... | 375/222 |
| 6,307,642 B1 | * | 10/2001 | Watanabe et al. ........... | 358/1.15 |
| 6,374,375 B1 | * | 4/2002 | Yip et al. .................... | 714/715 |

OTHER PUBLICATIONS

International Telecommunication Union, Telecommunication Standardization Sector of ITU, Data Communication Over The Telephone Network, ITU–T Recommendation V.34, (Sep. 1994).

* cited by examiner

Primary Examiner—Stephen Chin
Assistant Examiner—Chieh M. Fan
(74) Attorney, Agent, or Firm—Fleshner & Kim, LLP

(57) ABSTRACT

A method for connecting modems is disclosed, in which MP (modulation parameter sequence) is re-transmitted if no MP' is received from an opposite side for a prescribed time period after transmission of MP' to the opposite side. This can prevent a retrain sequence which can occur on continued transmission of MP to the opposite side due to no reception of MP. This can improve the speed of a connection sequence, having first, second, third, and fourth phases, where the fourth phase includes the steps of (1) transmitting MP to an opposite side and detecting reception of MP from the opposite side, (2) transmitting MP' upon reception of MP from the opposite side, (3) stopping transmission of MP' and re-transmitting MP when no MP' is received from the opposite side for a prescribed time period, and (4) completing connection upon reception of MP' from the opposite side.

17 Claims, 6 Drawing Sheets

METHOD FOR CONNECTING MODEMS

BACKGROUND OF THE INVENTION

1. Field of the Invention

The present invention relates to modems and a method for connecting the modems with an improved connection speed.

2. Background of the Related Art

Recent developments in communication have sharply increased the use of modems. The Telecommunication Standardization Sector of the International Telecommunication Union (ITU-T) has promulgated various recommendations and standards for data communication. There is consequently a need to improve the connection speed and rate between modems. According to ITU-T recommendations, which pertains to a connection speed of up to 28800 bps on a telephone line, modems are designed to connect through 4 phases of handshaking. These phases include a first phase of network interaction, a second phase of probing and ranging, a third phase of equalizing and echo canceler training, and a fourth phase of final training. A description of each phase, separately describing the call modem and the answer modem, is presented below.

For better understanding, a glossary of signal and sequence is provided. Additional details can be found in ITU-T Recommendation V.34.

ANS: Answer Tone, 2100 Hz

ANSAM: Amplitude modulated answer tone, 2100 Hz

CI: Call indicator signal, 300 bps, V.21(L) modulation

CM: Call menu signal, 300 bps, V.21(L) modulation, indicates modulation mode available in call modem.

CJ: CM Terminator, acknowledges detection of JM and indicates the end of CM, 300 bps, V.21(L) modulation.

JM: Joint menu signal, indicates modulation mode available jointly in call/answer modem, 300 bps, V.21(H) modulation.

Tone A: 2400 Hz, used by answer modem

Tone/A: Phase shifted Tone A

Tone B: 1200 Hz, used by call modem

Tone/B: Phase shifted Tone B

INFO sequence: Used to exchange modem capability, result of line probing, data mode modulation parameter.

Call modem: INFO0c, INFO1c

Answer modem: INFO0a, INFO1a

Modulation: DPSK, 600 bps

Carrier frequency: call modem—1200 Hz, answer modem—2400 Hz

INFOMARKSa: signal transmitted by answer modem by applying binary ones to the DPSK modulator.

INFOMARKSc: signal transmitted by call modem by applying binary ones to the DPSK modulator.

Line probing signal: L1, L2

L1: A set of tones spaced 150 Hz apart at frequency from 150 Hz to 3750 Hz (900 Hz, 1200 Hz, 1800 Hz and 2400 Hz are omitted), transmitted for 160 ms at a level 6 dB higher than a nominal power level.

L2: Same as L1 but is transmitted for no longer than 550 ms plus round trip delay at nominal power level.

B1: One data frame of scrambled binary one.

E: 20 bit sequence of binary ones

J: Whole number of repetitions of one of two 16 bit patterns.

| Constellation size | Bit 0~15 |
|---|---|
| 4 point | 0000100110010001 |
| 16 point | 0000110110010001 |

J': Used to terminate J, Bit 0~15=1111100110010001

MD: Manufacturer defined signal determined at INFO1.

PP: Used to train equalizer.

TRN: Scrambled binary one

MP: Modulation parameter sequence

Type 0: Contains maximum call-to-answer modem rates, maximum answer-to-call rates, amount of constellation shaping, encoder choice, nonlinear encoder parameter, auxiliary channel enable.

Type 1: Type 0 +precoder coefficient

MP': MP sequence with acknowledge bit set to 1

DSR: Data Set Ready

RXD: Received Data

RLSD: Data Channel Received Line Signal Detector

T: Symbol Interval; thus for 28,000 bps, T=1/28,800 sec
16T=16/28,000 sec
128T=128/28,000 sec
512T=512/28,800 sec Modem connection is accomplished in four phases, each of which will now be described.

FIRST PHASE

Figure 1:
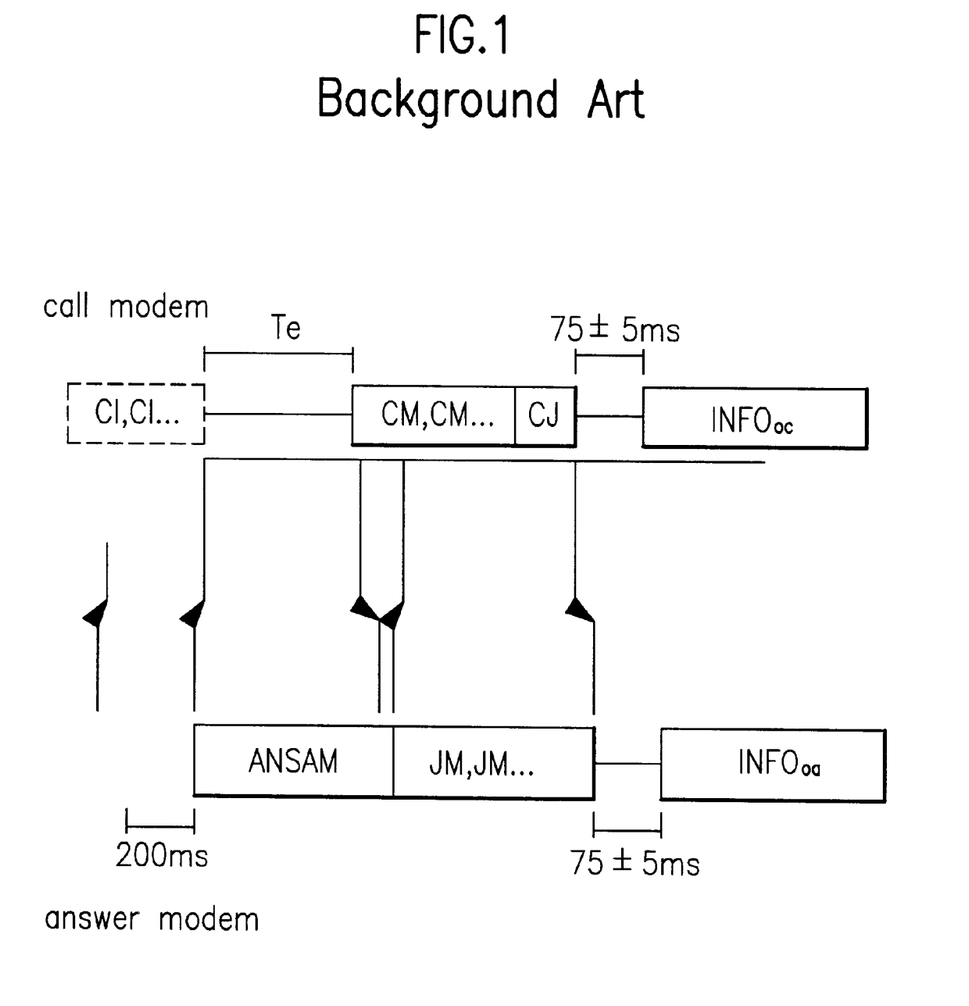
FIG. 1 is a diagram showing generation of a modem connecting signal in a related art first phase.

Referring to FIG. 1, the call modem initially transmits CI (call indicator signal, 300 bps, V.21(L) modulation), CJ (CM terminator, acknowledgment of JM detection) or CNG, and becomes ready to detect either of ANS/ANSAM. If the call modem detects ANSAM, it stops transmission for a prescribed time period Te. After this time period, the call modem is ready to detect JM, and also transmits CM. When two identical JM signals are detected, the modem transits CI and the process proceeds to the second phase after transmitting silence for 75 ms.

The answer modem initially transmits ANSAM remains silent for 200 ms, and then stands ready to detect CM. If two identical CMs are detected, the modem transmits JM, and becomes ready to detect CJ. When CJ is detected, the process proceeds to the second phase after transmitting silence for 75 ms.

SECOND PHASE

Figure 2:
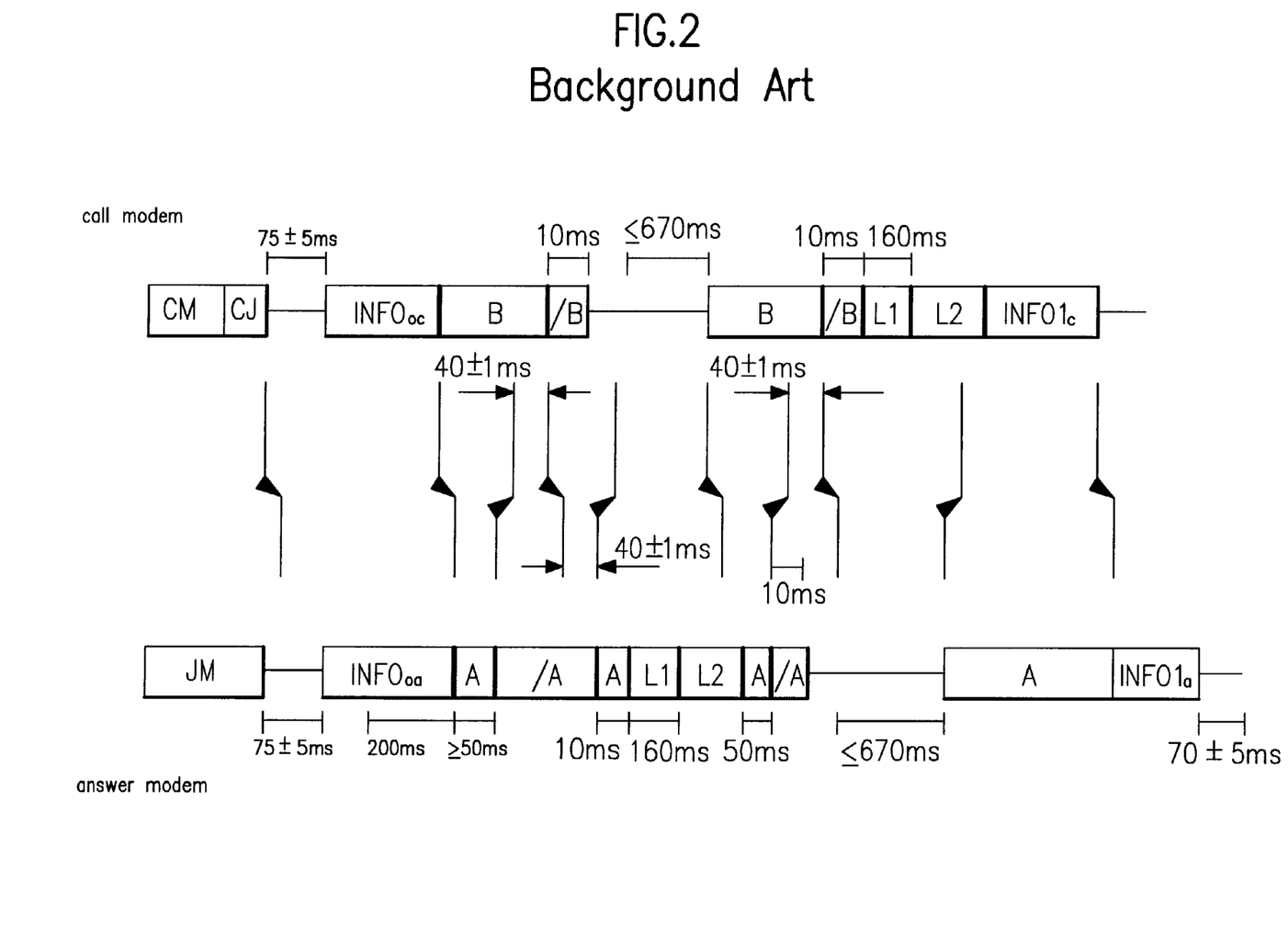
FIG. 2 is a diagram showing generation of a modem connecting signal in a related art second phase.

Referring to FIG. 2, the call modem initially receives INFO0a and Tone A from the answer modem, and transmits INFO0c and Tone B. Then, after receiving Tone/A for 40 ms, the call modem transmits Tone/B. The call modem then transmits silence and awaits reception of a second Tone/A. Upon detecting the second Tone/A the call modem calculates the RTD (Round Trip Delay). The RTD is the time interval between the appearance of the Tone/B and receiving the second Tone/A minus 40 ms.

The call modem then receives signal L1 from the answer modem. After receiving the L1 signal for 160 ms, the call modem receives the L2 signal for 500 ms, and subsequently transmits Tone B. Next, when the call modem detects Tone A and Tone//A, it transmits Tone/B for 10 ms, and becomes ready to detect Tone A again, while transmitting L1 and L2. Upon detection of Tone A, the call modem transmits INFO1c followed by transmission of silence. If the call modem subsequently receives INFO1a, the process proceeds to the third phase.

The answer modem initially transmits INFOa after the 75 ms silence from phase one. It becomes ready to detect INFO0c and Tone B. Upon detection of Tone B, the answer modem becomes ready to detect Tone/B, while transmitting Tone A followed by Tone/A. When Tone/B is detected, the answer modem calculates RTD. The RTD is the time interval between sending the Tone/A and receiving the Tone/B minus 40 ms.

After detecting Tone/B, the modem is ready to detect Tone B, and transmits Tone A, L1 and L2. After detection of Tone B, the answer modem transmits Tone/A, and then transmits silence. Next, after detecting Tone/B, the answer modem receives L1 and L2. After receiving L1 and L2, the answer modem becomes ready to detect INFO1c, and transmits Tone A. After detecting INFO1c, the answer modem transmits INFO1a. The process then proceeds to the third phase.

THIRD PHASE

Figure 3:
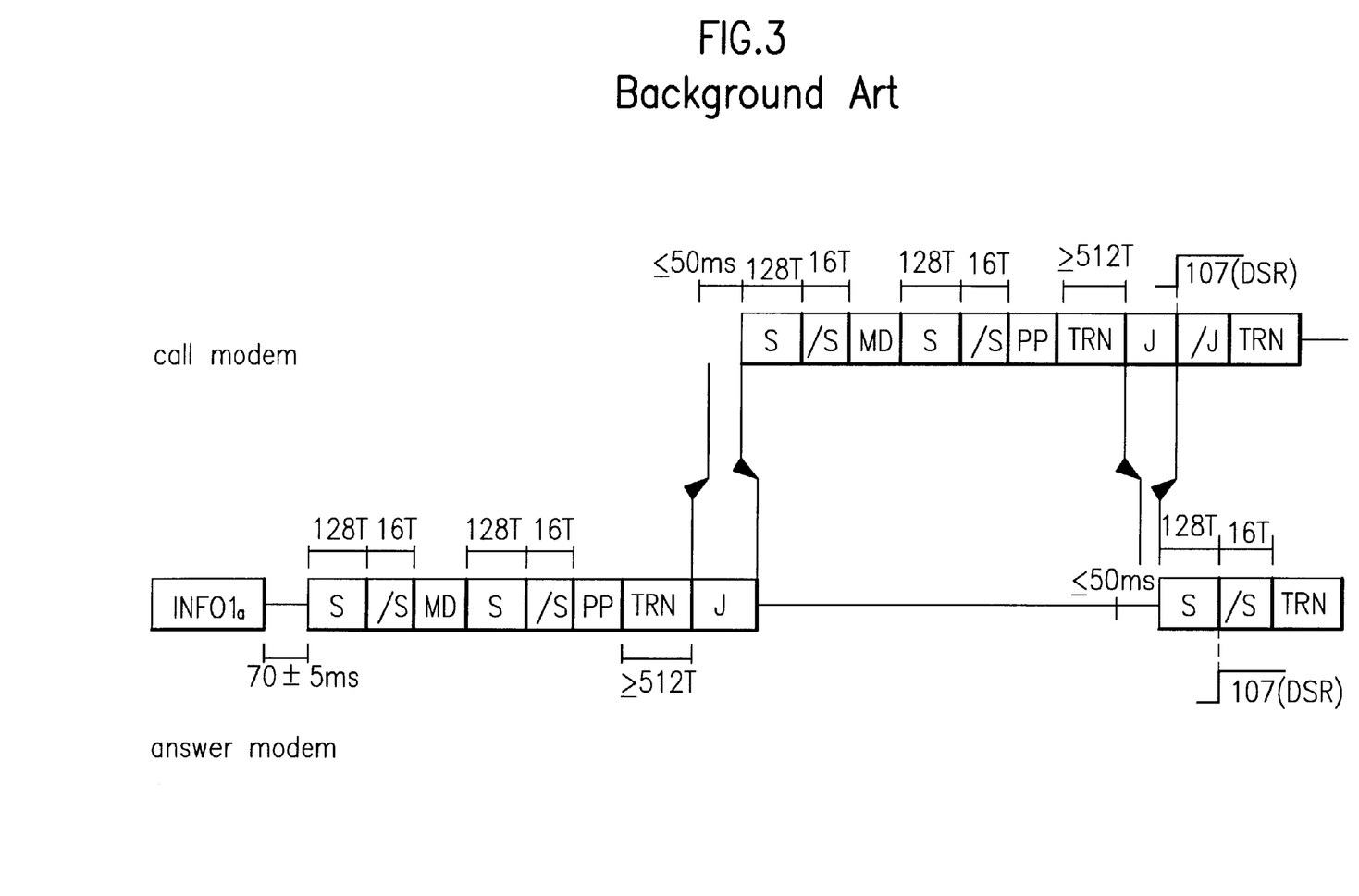
FIG. 3 is a diagram showing generation of a modem connecting signal in a related art third phase.

Referring to FIG. 3, the call modem initially detects S and /S, and, after the duration of signal MD, detects S and /S again. If S and /S are detected, the call modem trains its own equalizer using the PP sequence followed by the TRN sequence. After detecting the J sequence for 500 ms, the call modem transmits S and /S. If the duration of signal MD is zero, PP is transmitted; otherwise S, /S and PP are transmitted. The call modem then transmits the TRN sequence after transmission of the PP sequence. Next, the call modem becomes ready to detect S, and transmits the J sequence. When S is detected, the process proceeds to the fourth phase.

The answer modem, after transmitting INFO1a, transmits silence for 70 ms, followed by transmission of S and /S. If the duration of signal MD is as indicated in INFO1a, the answer modem transmits the PP sequence; otherwise, S, /S and PP are transmitted. Next, the answer modem transmits the TRN and j sequences, and becomes ready to detect S. After detecting after S and /S, the answer modem transmits silence and trains its equalizer with PP and TRN sequences if MD is zero. If, however, the duration of signal MD is not zero, the answer modem trains its equalizer with PP and TRN sequences after first detecting S and /S. Next, after detecting the J sequence for 50 ms, the answer modem transmits the S sequence, and the process proceeds to the fourth phase.

FOURTH PHASE

Figure 4:
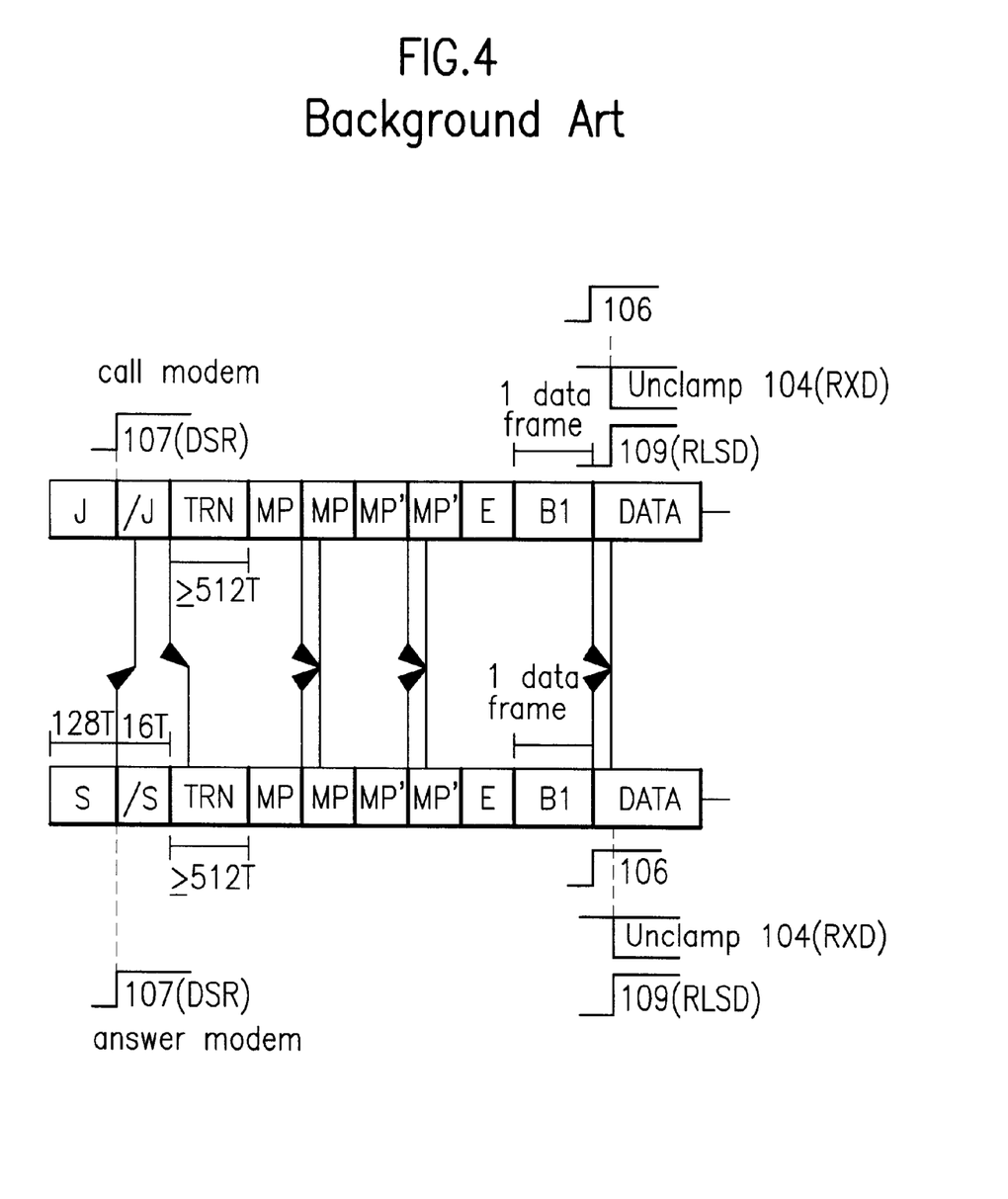
FIG. 4 is a diagram showing generation of a modem connecting signal in case a related art connection is successful.

Referring to FIG. 4, if the call modem detects the S sequence followed by the /S sequence, it ceases transmission of J and commences transmission of /J. At the transition from J to /J, circuit 107(DSR) is enabled to receive and train TRN. Next, after /J transmission, TRN is transmitted and trained. The TRN transmission is then stopped. The call modem then transmits the MP sequence and becomes ready to detect the MP sequence coming from the answer modem. Upon detection of the MP sequence, the call modem transmits MP' until it detects MP' or E sequence coming from the answer modem. Upon detection of MP', the call modem stops transmission of MP' and transmits the 20 bit E sequence. After the E sequence transmission, the modem enables circuit 106 (Ready for Sending) and B1 transmission commences (transmitted at a speed determined, finally from both sides). Upon detection of B1 coming from the answer modem, the modem unclamps circuit 104 (RXD) becomes low and turns on circuit 109 (RLSD).

The answer modem, after transmission of S sequence, turns on circuit 107, and then transmits /S and TRN. After training in TRN sequence from the call modem, the training is complete and the answer modem transmits MP. Upon detection of MP from the call modem, the answer modem transmits MP' until MP' or E sequence from the call modem is detected. If MP' is detected, the answer modem ceases transmission of MP' and transmits the 20 bit E sequence. After E transmission, while B1 is being transmitted at a speed determined finally from both sides circuit 106 is enabled. When B1 from the call modem is detected, the modem unclamps circuit 104 (RXD) and turns on circuit 109 (RLSD).

Figure 5:
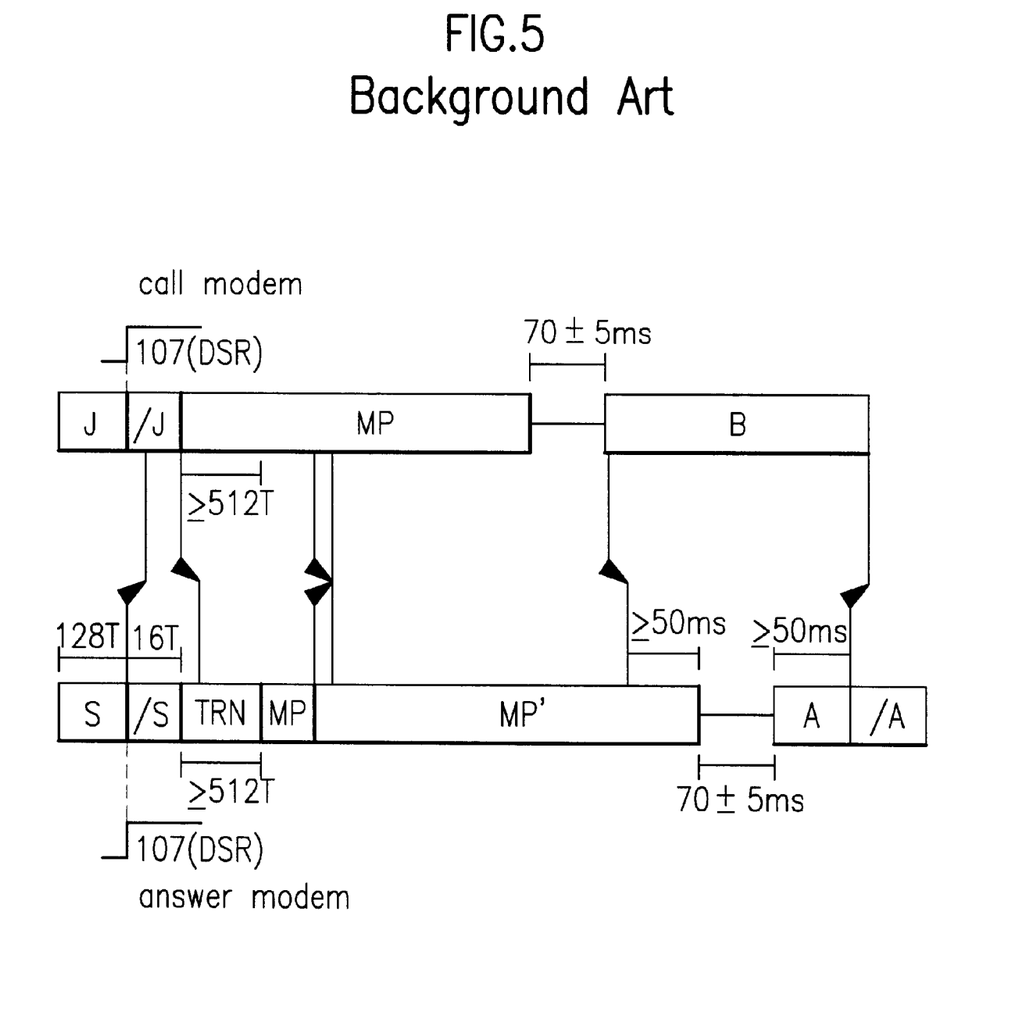
FIG. 5 is a diagram showing generation of a modem connection signal when connection of modems is failed in the fourth phase of the related art method for connecting modems; and, FIG. 6 is a diagram showing generation of a modem connection signal in a fourth phase of a method for connecting modems in accordance with a preferred embodiment of the present invention.

FIG. 5 shows an example of the generation of a modem connection signal when connection of modems fails in the fourth phase of the related art method for connecting modems.

Phase 4 of the related art is designed such that when MP is transmitted by a first and second modem and MP is received by the second modem, the second modem begins to transmit MP'. For example, when the call and answer modem transmit MP, the answer modem receives MP from the call modem and begins to transmit MP'. Similarly, at this time, when the call modem receives MP from the answer modem, it begins to transmit MP', as shown in FIG. 4. Thus, upon detection of MP from the other source, MP' is transmitted.

Referring to FIG. 5, the situation can arise where one modem does not receive MP from the other modem. Thus, in one instance, the call modem both transmits MP and awaits detection of MP sent from the answer modem. If, however, the call modem does not detect MP from the answer modem, it will continue transmitting MP and will not begin transmitting MP'. After a certain amount of time, if the call modem continues transmitting MP, it will retrain. In one example, the call modem tries to retrain while transmitting Tone B after transmitting silence for 70 ms. Upon reception of Tone B from the call modem for more than 50 ms, the answer modem transmits silence for 70 ms and responds to the retraining while transmitting Tone A.

Upon occurrence of the retrain, the system repeats phases 2–4. If, during the next occurrence of phase 4, the call modem properly receives MP, it will transmit MP' and go on to complete the connection, as shown in FIG. 4. Otherwise, if MP is not properly received, the system will again repeat the retrain process, as shown in FIG. 5. Similarly, this sequence will occur if the answer modem fails to detect MP from the call modem.

As explained above, the related art method for connecting modems has various disadvantages, including, when MP is not received properly, retrain occurs, and the time required for connection is greatly extended.

The above references and/or background art are incorporated by reference herein where appropriate for appropriate teachings of additional or alternative details, features and/or technical background.

SUMMARY OF THE INVENTION

The present invention is directed to a method for connecting modems that substantially obviates one or more of the problems due to limitations and disadvantages of the related art.

An object of the present invention is to minimize connection time.

Another object of the present invention is to prevent the occurrence of a retrain caused by no reception of MP from an opposite side.

Another object of the present invention is to provide a method for connecting modems, in which MP (modulation parameter sequence) is re-transmitted if no MP' is received from an opposite side for a prescribed time period after transmission of MP' to the opposite side so as to prevent retrain.

To achieve these and other advantages in whole or in part, there is provided a method for connecting modems having first, second, third, and fourth phases, where the fourth phase includes the steps of (1) transmitting MP to an opposite side and detecting reception of MP from the opposite side, (2) transmitting MP' upon reception of MP from the opposite side, (3) stopping transmission of MP' and re-transmitting MP when no MP' is received from the opposite side for a preset time period, and (4) completing connection upon reception of MP' from the opposite side.

To achieve these and other advantages in whole or in part, there is also provided a method for establishing a connection between a first modem and a second modem, having the steps of transmitting a first signal by the first modem to the second modem, transmitting a second signal by the first modem to the second modem in response to the first signal received by the first modem from the second modem, discontinuing transmission of the second signal and transmitting the first signal by the first modem when the first modem does not receive the second signal from the second modem during a prescribed period of time.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Reference will now be made in detail to the preferred embodiments of the present invention, examples of which are illustrated in the accompanying drawings.

A first preferred embodiment of this invention is designed to prevent occurrence of a retrain during phase 4. Thus, phases 1, 2, 3 and 4 are the same as the related art in a normal case. If, however, one modem fails to receive MP from an opposite side, the fourth phase is conducted as follows.

Figure 6:
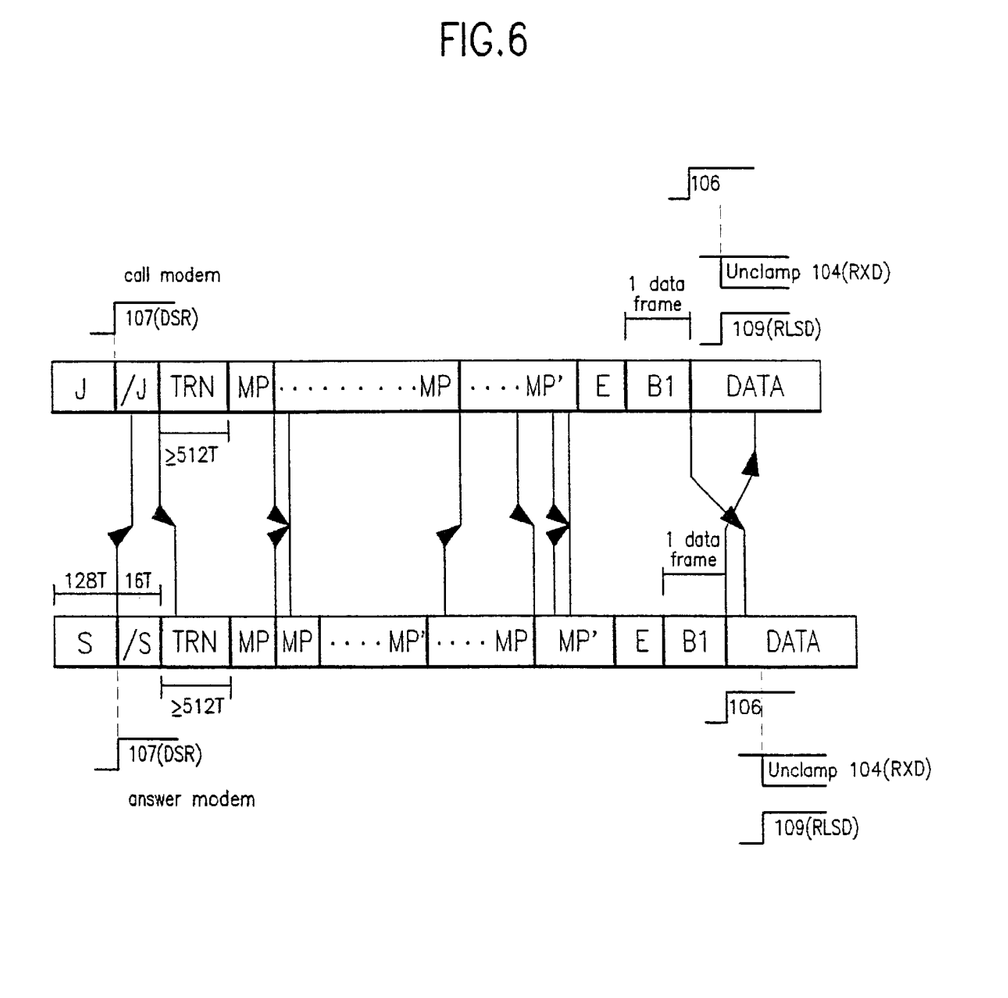

Referring to FIG. 6, according to one embodiment, after both modems begin transmitting MP, the answer modem awaits reception of MP' from the call modem. If MP is not properly detected, transmission of MP' will not occur. If MP' is not transmitted from the call modem within a preset time period, the answer modem is designed to cease transmission L4 of MP', and transmit MP again while checking to see if MP' is received from the call modem. If the answer modem receives MP' from the call modem, the answer modem will then transmit MP'. Thus, when MP' is received from the opposite side while transmitting MP, a retraining occurs within a time out period of the fourth phase if no MP is re-transmitted from the opposite side after a preset time. Moreover, the connection can be stopped instead of retraining. In this embodiment, MP retransmission period is set to be shorter than a time out period of the fourth phase.

If the answer modem receives MP' from the call modem, E is transmitted and the connection is completed by transmitting B1. If, however, there is no reception of MP' from the call modem after MP is re-transmitted from the answer modem, either a retrain is provided, or the connection is stopped by providing a rate renegotiation cleardown sequence. And, upon reception of MP' from the opposite side after re-transmission of the MP, MP' is transmitted. Similarly, in the case when the answer modem continues transmitting MP when the call modem transmits MP' in response to MP received from the answer modem, the call modem stops transmission of MP' and follows the procedure as described above.

The method for connecting modems according to an embodiment of the present invention has the advantage that it prevents the occurrence of retrain, thereby increasing connection speed.

It will be apparent to those skilled in the art that various modifications and variations can be made in the method for connecting modems of the present invention without departing from the spirit or scope of the invention. Thus, it is intended that the present invention cover the modifications and variations of this invention provided they come within the scope of the appended claims and their equivalents.

The foregoing embodiments are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed s:

1. A method for connecting modems, the method comprising first, second, third and fourth phases, the fourth phase comprising the steps of:
   (1) transmitting MP to an opposite side and detecting reception of MP from the opposite side;
   (2) transmitting MP' upon reception of MP from the opposite side;
   (3) stopping transmission of MP' and re-transmitting MP when no MP' is received from the opposite side for a preset time period; and
   (4) completing connection upon reception of MP' from the opposite side.

2. The method of claim 1, further comprising the step of retraining in a case when MP' is not received from the opposite side despite of re-transmission of MP in step (3).

3. The method of claim 2, further comprising the step of stopping connection instead of retraining.

4. The method of claim 1, wherein a time period for the re-transmission of MP is set to be shorter than a time out period of the fourth phase.

5. The method of claim 1, wherein MP' is transmitted upon reception of MP' from the opposite side after re-transmission of the MP.

6. The method of claim 1, wherein, in a case when MP' is received from the opposite side while transmitting MP, a retraining occurs within a time out period of the fourth phase if no MP is re-transmitted from the opposite side after a preset time.

7. The method of claim 6, wherein the connection is stopped instead of retraining.

8. A method for establishing a connection between a first modem and a second modem, comprising the steps of:
 a) transmitting a first signal by the first modem to the second modem;
 b) transmitting a second signal by the first modem to the second modem in response to the first signal being received by the first modem from the second modem;
 c) discontinuing transmission of the second signal and re-transmitting the first signal by the first modem when the first modem does not receive the second signal from the second modem during a prescribed period of time.

9. The method of claim 8, wherein the period of re-transmission of the first signal by the first modem is less than a time-out period.

10. The method of claim 8, wherein the second modem is an answer modem.

11. The method of claim 8, wherein the second modem is a call modem.

12. The method of claim 8, further comprising
 d) discontinuing re-transmission of the first signal by the first modem after a prescribed period of time, and initiating a retrain sequence.

13. The method of claim 8, further comprising
 d) completing the connection in response to the second signal being received by the first modem from the second modem.

14. The method of claim 8, further comprising
 d) discontinuing re-transmission of the first signal by the first modem after a prescribed period of time, and aborting connection attempt.

15. The method of claim 8, wherein steps a, b, and c form at least part of the fourth phase of a four phase connection method.

16. The method of claim 8, wherein the first signal is a modulation parameter signal (NP) and the second signal is an MP signal with an acknowledgment bit set to 1 (MP').

17. The method of claim 8, wherein the prescribed period of time is less than a time-out period of time.

* * * * *